Nov. 20, 1956  C. NIGGELOH  2,771,261
TELESCOPING TRIPOD LEG
Filed May 8, 1951
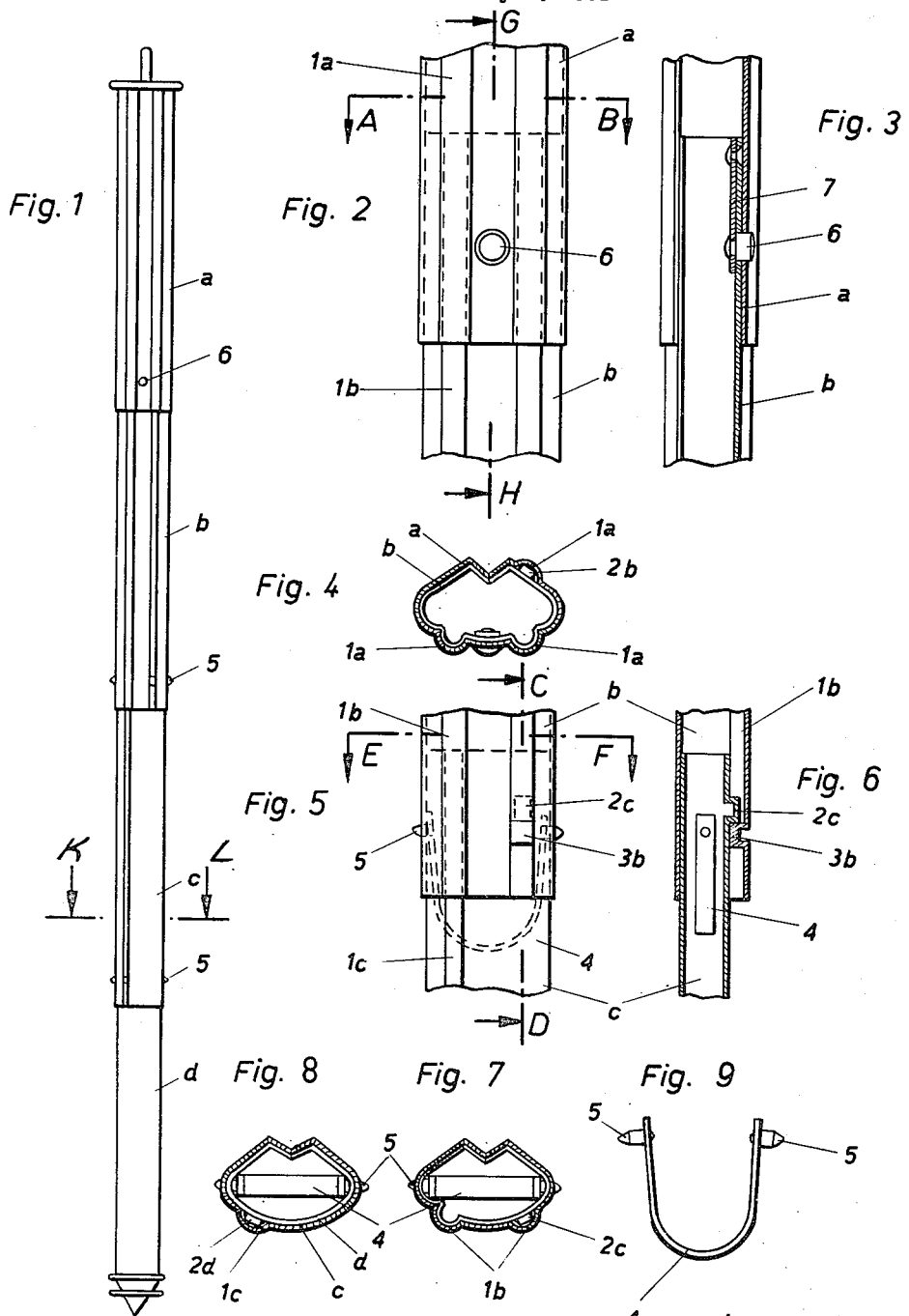

United States Patent Office 2,771,261
Patented Nov. 20, 1956

2,771,261

TELESCOPING TRIPOD LEG

Carl Niggeloh, Radevormwald, Germany, assignor to Kürbi & Niggeloh, Radevormwald, Germany, a firm Application May 8, 1951, Serial No. 225,115

Claims priority, application Germany May 11, 1950

6 Claims. (Cl. 248—191)

The present invention relates to a supporting structure for a camera or similar device. Such supporting structures may take the form of tripods, for example.

More particularly, the present invention relates to supporting structures wherein the legs are formed of telescoped tubes so that the legs may be moved between a collapsed and extended position. In conventional supporting structures which have legs formed from telescoped tubes, particularly where these tubes have an oval cross-section, the tubes are provided on their inner side with an elongated wide slot which provide a guide means for stops located on associated tubes, and the ends of these slots engage the stops to limit the extension of the telescoped tubes. The disadvantage of this type of construction is that foreign matters, such as dirt and sand for example, easily enter into the interior of the tubes through such slots, and such foreign matter prevents the best possible operation of the telescoped tubes.

One of the objects of the present invention is to prevent foreign matter from entering into the interior of the tubes of the legs of the supporting structures, so as to avoid the above-mentioned disadvantage.

A further object of the present invention is to provide very stiff, strong telescoped tubes for a leg of a supporting structure.

A still further object of the present invention is to form the legs of support structures of telescoped tubes which have a minimum number of additional parts added thereto so that a great economy and simplicity of construction results.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows in elevational view a leg of a supporting structure which is constructed in accordance with the present invention and which is shown in its extended position;

Fig. 2 shows a fragmentary elevational view of the overlapping portions of the first and second top telescoped tubes of the structure illustrated in Fig. 1;

Fig. 3 is a sectional view of the structure shown in Fig. 2 taken along the line G—H of Fig. 2;

Fig. 4 is a sectional view of the structure shown in Fig. 2 taken along the line A—B of Fig. 2 and looking downwardly from the first top tube toward the next lowermost tube;

Fig. 5 is a fragmentary elevational view of the overlapping portions of the two intermediate tubes of the structure shown in Fig. 1;

Fig. 6 is a sectional view taken along line C—D of Fig. 5;

Fig. 7 is a sectional view taken along line E—F of Fig. 5 and looking downwardly;

Fig. 8 is a horizontal sectional view taken through the second tube from the bottom of the structure shown in Fig. 1 and looking downwardly toward the first along the line K—L of Fig. 1 tube; and Fig. 9 is an elevational view of a spring member which supports a pair of pins associated with the device.

Referring to the particular embodiment of the invention which is illustrated in the drawings, Fig. 1 shows an extended leg of a supporting structure, the said leg being composed of four telescoped tubes $a$, $b$, $c$ and $d$.

In order to maintain the tubes in the extended position shown in Fig. 1, there is provided adjacent the upper end of tube $b$, as shown most clearly in Fig. 3, a leaf spring member 7 connected at one end thereof to the tube $b$ by a rivet or other suitable means, and this leaf spring 7 has connected to the other end thereof a button 6 which extends through an opening formed in the tube $b$ and an aligned opening formed in the tube $a$ when the tubes are in the extended position shown in Fig. 1. It will be noted that the outer part of button 6 is cylindrical in shape so that it is necessary for the user to press button 6 inwardly in order to permit tubes $a$ and $b$ to slide with respect to each other to their collapsed position.

A substantially U-shaped leaf spring member 4, shown in Figs. 6 and 9, is located within the tube $c$, and an identical leaf spring member 4 is located within the tube $d$. These leaf spring members are respectively located adjacent the upper ends of the tubes $c$ and $d$, and they carry adjacent their outer extremities a pair of pin members 5 which have rounded outer ends. These pin members 5 extend through opposite openings formed in the tubes $c$ and $d$, and the pin members 5 of tube $c$ extend through aligned openings of tube $b$ when tubes $b$ and $c$ are in the extended position shown in Fig. 1. Pin members 5 of tube $d$ extend through aligned openings of tube $c$ when tubes $c$ and $d$ are in the extended position shown in Fig. 1. The rounded outer ends of the pins 5 in tube $c$ engage the aligned openings of tube $b$, and the rounded outer ends of the pins 5 in tube $d$ engage the openings of tube $c$. Due to this construction, the pins 5 are capable of holding the tubes $b$, $c$ and $d$ in the extended position shown in Fig. 1, but these pins 5 will be moved inwardly when tube $b$ is pressed downwardly towards tube $c$ and when tube $c$ is pressed downwardly towards tube $d$, so that tubes $b$, $c$ and $d$ may be slidably moved with respect to each other into their collapsed position without manual depression of the pins 5 by the operator. The springs 4 urge the pins 5 outwardly so that they automatically engage with their associated openings when the tubes $b$, $c$ and $d$ are extended, and leaf spring 7 urges button 6 outwardly so that it automatically engages the associated opening in tube $a$ when tubes $a$ and $b$ are extended.

Tubes $a$, $b$, $c$ and $d$ may be formed from suitably shaped plates or from tubular stock, and it will be noted from Figs. 4, 7 and 8 that the tubes have a non-circular cross section and are uninterrupted and continuous over the entire length thereof except for the openings which engage the pins 5 and 6. However, these openings are located in those portions of the tubes which overlap an adjacent tube when the tubes are in the extended position of Fig. 1, so that no dirt can enter into the interior of the tubes through these openings. It is thus seen that the entire space enclosed by all of the tubes, whether the tubes are extended as shown in Fig. 1 or collapsed, is completely enclosed by the tubes so that no dirt can enter into the tubes to disturb the slidable movement of the tubes with respect to each other.

The tube $a$, as is shown in Fig. 4, is provided with three elongated channels $1a$ which are distributed somewhat evenly about the tube so that one channel is located on one side of the tube and two channels are located on the other side of the tube. These channels 1a are formed from the material of the tube a so that they provide ribs extending along the outer side of the tube, and these ribs serve to stiffen and strengthen the tube a.

The channel 1a of tube a which is shown in the upper part of Fig. 4 is provided adjacent its lower end with a stop means which is formed by an inwardly pressed part of this channel similar to inwardly pressed part 3b shown in Fig. 6.

Tube b is formed with one less than the number of channels of tube a, as is clearly evident from Fig. 4, and these channels 1b are of substantially the same construction as the channels 1a. As may be seen from Fig. 4, the channels 1b are aligned with the channels 1a so that the channels 1b slide in the channels 1a. In line with the third channel 1a which is not repeated in tube b there is located on tube b a projection 2b which is formed by an outwardly pressed part of the tube b of the same construction as the outwardly pressed part 2c shown in Fig. 6. When tubes a and b are moved into their extended position shown in Fig. 1, projection 2b engages the above described stop in the channel 1a shown in the upper part of Fig. 4 so as to limit the movement of tubes a and b with respect to each other.

Tube c is formed with a channel 1c, and it will be noted that tube b has only two channels so that tube c has one less than the number of channels in tube b. Channel 1c is of the same construction as the above-described channels and is located within one of the channels 1b. In line with the other channel 1b, tube c is formed with a projection 2c by pressing the material of the tube outwardly and this projection engages an inwardly pressed part of this other channel 1b which thereby forms a stop means 3b to engage projection 2c and limit the movement of tubes b and c with respect to each other, as is clearly illustrated in Fig. 6. Channel 1c is provided adjacent its lower end with an inwardly pressed part which forms a stop to engage the projection 2d formed of an outwardly pressed part located adjacent the top of tube d and of the same construction as projection 2c shown in Fig. 6.

Since the channels, projections and stops are all formed of the material of the tubes, there is a minimum of additional parts connected to the tubes which results in a great economy and simplicity of construction. Moreover, the construction of these elements is such that they create no openings extending through the tubes so that the space enclosed by the tubes is completely covered, and foreign matter cannot enter into this space.

It will be noted that in the particular example illustrated, where there are four telescoped tubes, the tube which carries the greatest number of channels has a number of channels which is equal to one less than the total number of tubes, and the number of channels in the succeeding tubes are progressively decreased by one. Also, each tube except the topmost tube has a projection which is in line with that channel of the next uppermost tube which is left off, and this latter channel has the stop therein which engages this projection. It is thus apparent, therefore, that if the invention is applied to a leg having only three tubes, the tubes b, c and d could be provided and tube b would then not need the projection 2b. Also, if the leg were made of five or more tubes, then the above relationship would still take place, that is, the topmost tube would have a number of channels equal to one less than the number of tubes, and each tube succeeding the topmost tube would progressively have one less than the number of channels of the topmost tube and projections and stops as described above.

It will be understood that each of the elements described above, or two or more together, may also find a useful application in other types of supporting structures differing from the types described above.

While the invention has been illustrated and described as embodied in supporting structures for cameras and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A leg of a supporting structure for cameras and the like, comprising in combination, a first tube of non-circular cross section having a plurality of spaced elongated channels located along its inner surface and extending outwardly from its outer surface, one of said channels having a stop means located therein, and said first tube having a projection located on its outer surface; a second tube telescopically mounted about said first tube for sliding movement thereon and having a cross section mating with that of said first tube, said second tube having a number of spaced elongated channels located along its inner surface which is equal to one more than the number of elongated channels located in said first tube, one of said channels of said second tube having a stop means located therein and said one channel of said second tube being located over said projection of said first tube so that said projection cooperates with said stop means in said one channel of said second tube to limit the movement of said second tube with respect to said first tube; and a third tube telescopically mounted within said first tube for sliding movement therein and having a number of elongated channels located along its inner surface which is equal to one less than the number of elongated channels in said first tube, said third tube having a projection located on its outer surface and mounted in said one channel of said first tube so as to cooperate with said stop means in said one channel of said first tube to limit the movement of said third tube with respect to said first tube.

2. A leg of a supporting structure for cameras and the like, comprising in combination, a first tube having a plurality of spaced elongated channels located along its inner surface and extending outwardly from its outer surface, one of said channels having a stop means located therein, and said first tube having a projection located on its outer surface; a second tube telescopically mounted about said first tube for sliding movement thereon, said second tube having a number of spaced elongated channels located along its inner surface which is equal to one more than the number of elongated channels located in said first tube, one of said channels of said second tube having a stop means located therein and said one channel of said second tube being located over said projection of said first tube so that said projection cooperates with said stop means in said one channel of said second tube to limit the movement of said second tube with respect to said first tube; and a third tube telescopically mounted within said first tube for sliding movement therein and having a number of elongated channels located along its inner surface which is equal to one less than the number of elongated channels in said first tube, said third tube having a projection located on its outer surface and mounted in said one channel of said first tube so as to cooperate with said stop means in said one channel of said first tube to limit the movement of said third tube with respect to said first tube, all of said channels being formed from the material of said tubes so that said tubes have ribs located on the outer sides thereof, said ribs being distributed about the entire periphery of said tubes.

3. A leg of a supporting structure for cameras and the like, comprising in combination, a first tube having a plurality of spaced elongated channels located along its inner surface and extending outwardly from its outer surface, one of said channels having a stop means located therein, and said first tube having a projection located on its outer surface; a second tube telescopically mounted about said first tube for sliding movement thereon, said second tube having a number of spaced elongated channels located along its inner surface which is equal to one more than the number of elongated channels located in said first tube, one of said channels of said second tube having a stop means located therein and said one channel of said second tube being located over said projection of said first tube so that said projection cooperates with said stop means in said one channel of said second tube to limit the movement of said second tube with respect to said first tube; and a third tube telescopically mounted within said first tube for sliding movement therein and having a number of elongated channels located along its inner surface which is equal to one less than the number of elongated channels in said first tube, said third tube having a projection located on its outer surface and mounted in said one channel of said first tube so as to cooperate with said stop means in said one channel of said first tube to limit the movement of said third tube with respect to said first tube, all of said channels being formed from the material of said tubes so that said tubes have ribs located on the outer sides thereof, said ribs being distributed about the entire periphery of said tubes, said stop means being formed of an inwardly pressed part of the channel in which they are respectively located and said projections being formed of an outwardly pressed part of the material of the tube.

4. A leg of a supporting structure for cameras and the like, comprising in combination, a first tube having a plurality of spaced elongated channels located along its inner surface and extending outwardly from its outer surface, one of said channels having a stop means located therein, and said first tube having a projection located on its outer surface; a second tube telescopically mounted about said first tube for sliding movement thereon, said second tube having a number of spaced elongated channels located along its inner surface which is equal to one more than the number of elongated channels located in said first tube, one of said channels of said second tube having a stop means located therein and said one channel of said second tube being located over said projection of said first tube so that said projection cooperates with said stop means in said one channel of said second tube to limit the movement of said second tube with respect to said first tube; and a third tube telescopically mounted within said first tube for sliding movement therein and having a number of elongated channels located along its inner surface which is equal to one less than the number of elongated channels in said first tube, said third tube having a projection located on its outer surface and mounted in said one channel of said first tube so as to cooperate with said stop means in said one channel of said first tube to limit the movement of said third tube with respect to said first tube, all of said channels being formed from the material of said tubes so that said tubes have ribs located on the outer sides thereof, said ribs being distributed about the entire periphery of said tubes, said stop means being formed of an inwardly pressed part of the channel in which they are respectively located and said projections being formed of an outwardly pressed part of the material of the tube, the channels of each tube being in alignment with the channels of an adjacent tube so that the ribs located on the outer surface of one tube slidably engage the channels located on the inner surface of an adjacent tube.

5. A leg of a supporting structure for cameras and the like, comprising in combination, a first tube having a plurality of spaced elongated channels located along its inner surface and extending outwardly from its outer surface, one of said channels having a stop means located therein adjacent one end thereof, and said first tube having a projection located on its outer surface adjacent the other end thereof; a second tube telescopically mounted about said first tube for sliding movement thereon and having one end which overlaps said other end of said first tube when said first and second tubes are in extended position, said second tube having a number of spaced elongated channels located along its inner surface which is equal to one more than the number of elongated channels located in said first tube, one of said channels of said second tube having a stop means located therein adjacent said one end of said second tube and said one channel of said second tube being located over said projection of said first tube so that said projection cooperates with said stop means in said one channel of said second tube to limit the movement of said second tube with respect to said first tube; and a third tube telescopically mounted within said first tube for sliding movement therein, said third tube having one end which overlaps said one end of said first tube when said first and third tubes are in an extended position, and having a number of elongated channels located along its inner surface which is equal to one less than the number of elongated channels in said first tube, said third tube having a projection located on its outer surface adjacent said one end of said third tube and mounted in said one channel of said first tube so as to cooperate with said stop means in said one channel of said first tube to limit the movement of said third tube with respect to said first tube, all of said channels being formed from the material of said tubes so that said tubes have ribs located on the outer sides thereof, said ribs being distributed about the entire periphery of said tubes, said stop means being formed of an inwardly pressed part of the channel in which they are respectively located and said projections being formed of an outwardly pressed part of the material of the tube, the channels of each tube being in alignment with the channels of an adjacent tube so that the ribs located on the outer surface of one tube slidably engage the channels located on the inner surface of an adjacent tube.

6. A leg of a supporting structure for cameras and the like, comprising in combination, a first tube having a plurality of spaced elongated channels located along its inner surface and extending outwardly from its outer surface, one of said channels having a stop means located therein adjacent one end thereof, and said first tube having a projection located on its outer surface adjacent the other end thereof; a second tube telescopically mounted about said first tube for sliding movement thereon and having one end which overlaps said other end of said first tube when said first and second tubes are in an extended position, said second tube having a number of spaced elongated channels located along its inner surface which is equal to one more than the number of elongated channels located in said first tube, one of said channels of said second tube having a stop means located therein adjacent said one end of said second tube and said one channel of said second tube being located over said projection of said first tube so that said projection cooperates with said stop means in said one channel of said second tube to limit the movement of said second tube with respect to said first tube; a third tube telescopically mounted within said first tube for sliding movement therein, said third tube having one end which overlaps said one end of said first tube when said first and third tubes are in an extended position, and having a number of elongated channels located along its inner surface which is equal to one less than the number of elongated channels in said first tube, said third tube having a projection located on its outer surfaces adjacent said one end of said third tube and mounted in said one channel of said first tube so as to cooperate with said stop means in said one channel of said first tube to limit the movement of said third tube with respect to said first tube, all of said channels being formed from the material of said tubes so that said tubes have ribs located on the outer sides thereof, said ribs being distributed about the entire periphery of said tubes, said stop means being formed of an inwardly pressed part of the channel in which they are respectively located and said projections being formed of an outwardly pressed part of the material of the tube, the channels of each tube being in alignment with the channels of an adjacent tube so that the ribs located on the outer surface of one tube slidably engage the channels located on the inner surface of an adjacent tube; and the outer surfaces of said tubes being uninterrupted and continuous over the entire length of the non-overlapping portion thereof so that no dirt can enter into the interior of said tubes.

References Cited in the file of this patent

UNITED STATES PATENTS

| 701,042 | Holmes | May 27, 1902 |
| 1,237,014 | Bothy et al. | Aug. 14, 1917 |
| 2,229,475 | Redmer | Jan. 21, 1941 |
| 2,476,216 | Polleau | July 12, 1949 |

FOREIGN PATENTS

| 117,461 | Sweden | Oct. 22, 1946 |
| 581,685 | Germany | Aug. 1, 1933 |
| 744,194 | France | Apr. 14, 1933 |